(12) United States Patent
Yonemoto

(10) Patent No.: US 11,305,539 B2
(45) Date of Patent: Apr. 19, 2022

(54) METHOD OF MANUFACTURING SUBSTRATE LAMINATED BODY, SUBSTRATE FOR LIQUID EJECTION HEAD AND METHOD OF MANUFACTURING SUBSTRATE FOR LIQUID EJECTION HEAD

(71) Applicant: CANON KABUSHIKI KAISHA, Tokyo (JP)

(72) Inventor: Taichi Yonemoto, Isehara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/935,477

(22) Filed: Jul. 22, 2020

(65) Prior Publication Data

US 2021/0031524 A1 Feb. 4, 2021

(30) Foreign Application Priority Data

Jul. 29, 2019 (JP) .............................. JP2019-138741

(51) Int. Cl.
*B41J 2/16* (2006.01)
*B41J 2/14* (2006.01)
*B32B 7/12* (2006.01)

(52) U.S. Cl.
CPC .............. *B41J 2/1623* (2013.01); *B32B 7/12* (2013.01); *B41J 2/14* (2013.01); *B41J 2/14024* (2013.01); *B41J 2/1433* (2013.01); *B41J 2/1626* (2013.01); *B41J 2/1631* (2013.01); *B41J 2/1635* (2013.01); *B41J 2/1642* (2013.01); *B41J 2002/14419* (2013.01); *B41J 2202/22* (2013.01)

(58) Field of Classification Search
CPC ........ B41J 2/1623; B41J 2/14; B41J 2/14024; B41J 2/1433; B41J 2/1626; B41J 2/1631; B41J 2/1635; B41J 2/1642; B41J 2002/14419; B41J 2202/22; B41J 2/1606; B41J 2/1628; B41J 2/1629; B41J 2/1632; B41J 2/1645; B41J 2/1603; B32B 7/12
See application file for complete search history.

(56) References Cited

U.S. PATENT DOCUMENTS

2018/0354267 A1* 12/2018 Fukumoto .............. B41J 2/1642

FOREIGN PATENT DOCUMENTS

JP 2014-124887 A 7/2014

OTHER PUBLICATIONS

IP.com search (Year: 2022).*

* cited by examiner

*Primary Examiner* — Lisa Solomon
(74) *Attorney, Agent, or Firm* — Venable LLP

(57) ABSTRACT

A substrate laminated body is formed by joining a first substrate for forming a part of a device and a second substrate for forming another part of the device. The first and second substrates are joined by a method comprising: a temporarily joining step of arranging an adhesive agent outside a device forming region and temporarily joining the device forming regions of the first substrate and the second substrate to be held in a non-contact state, and a finally joining step of forming a film so as to fill a gap between the device forming regions in the non-contact state and finally joining the first substrate and the second substrate by way of the film.

16 Claims, 8 Drawing Sheets

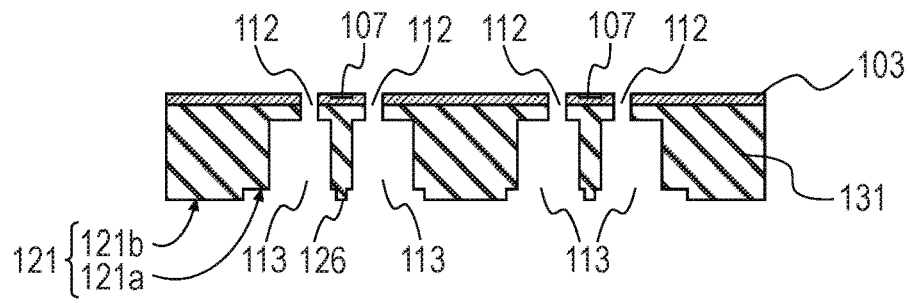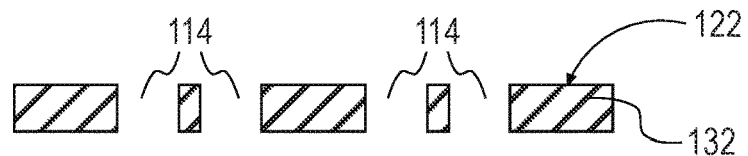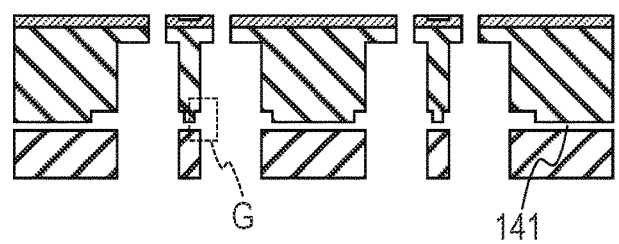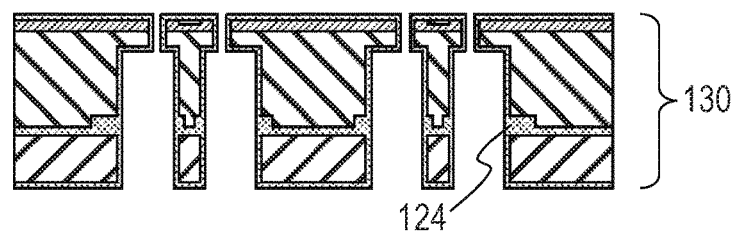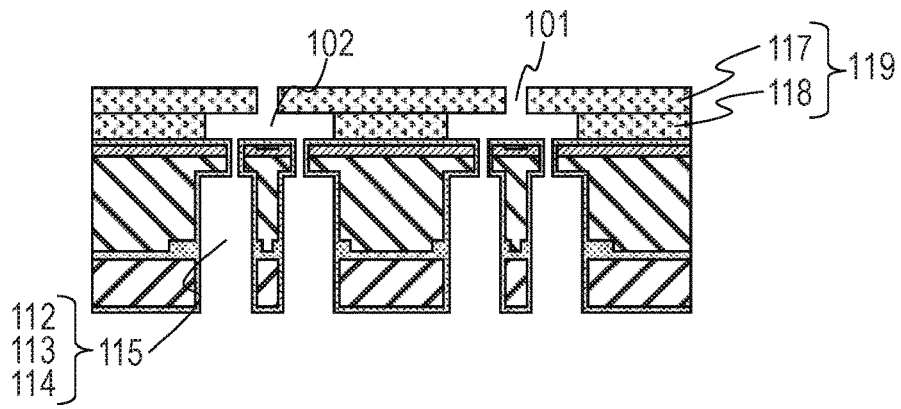

METHOD OF MANUFACTURING SUBSTRATE LAMINATED BODY, SUBSTRATE FOR LIQUID EJECTION HEAD AND METHOD OF MANUFACTURING SUBSTRATE FOR LIQUID EJECTION HEAD

BACKGROUND OF THE INVENTION

Field of the Invention

The present invention relates to a method of manufacturing a substrate laminated body formed by joining a plurality of substrates, a substrate for liquid ejection head that has a structure of joined substrates and a method of joining a plurality of substrates.

Description of the Related Art

In recent years, devices comprising a substrate laminated body formed by joining a plurality of substrates together by way of an adhesive agent have been and being popularly manufactured in the field of manufacturing micro electro-mechanical systems (MEMS) such as pressure sensors and acceleration sensors and functional devices such as micro-fluidic devices. Examples of such devices include liquid ejection heads for ejecting liquid.

Example of liquid ejection heads in turn include inkjet recording heads. An inkjet recording head comprises a substrate having energy generating elements for generating energy for the purpose of ejecting ink. An ejection orifice forming member is arranged on the surface of the substrate. A plurality of ejection orifices for ejecting ink are arranged in the ejection orifice forming member. Additionally, through holes are formed in the substrate as ink flow paths and ink is supplied through the substrate from the rear surface side to the front surface side of the substrate by way of the through holes. The through holes and the ejection orifices are respectively held in communication with each other. Thus, after passing the through holes, ink is ejected from the ejection orifices by the force applied from the respective energy generating elements. Energy generating elements that can be used for liquid ejection heads include elements that are so designed as to be capable of boiling ink by electrical heating such as heater elements and those that are so designed as to be capable of applying pressure to liquid by utilizing volume changes such as piezoelectric elements.

An inkjet recording head is formed by joining substrates of the above-described type that have their own through holes and are processed such that, when joined together by way of an adhesive agent, the through holes are brought into communication with each other to produce ink flow paths.

Japanese Patent Application Laid-Open No. 2014-124887 discloses an inkjet recording head in which flow paths for ejecting liquid, each including a nozzle opening, are arranged and which has a plurality of substrates that are joined together by way of an adhesive agent and thin film that is made of tantalum oxide or the like and laid on the inner walls of the flow paths by means of atomic layer deposition. FIG. 1A of the accompanying drawings shows a schematic cross section of the substrate laminated body described in Japanese Patent Application Laid-Open No. 2014-124887. The substrate laminated body 150 shown in FIG. 1A is formed by joining a first substrate 151 and a second substrate 152 by way of an adhesive agent 153. The substrate laminated body 150 has ink flow paths 154 running all the way through the first substrate 151, the second substrate 152 and a third substrate 156 and ejection orifices 155 for ejecting ink are formed in the first substrate 151. A protective film 157 that is made of at least a material selected from a group of materials including tantalum oxide, hafnium oxide and zirconium oxide that can be formed by means of atomic layer deposition is laid on the inner wall surfaces including the exposed surfaces of the adhesive agent 153 of the ink flow paths 154. Thus, Japanese Patent Application Laid-Open No. 2014-124887 describes the above-described arrangement for joining the substrates.

When substrates are joined together by means of an adhesive agent with the prior art as shown in FIG. 1A, problems can arise along the interfaces of joined members depending on how and under what conditions the adhesive agent 153 is applied (see FIG. 1). In inkjet recording heads that accommodate multicolor printing, ink flow paths may be arranged side by side in the single head to accommodate a plurality of printing colors. When one or more voids 160 are produced along an interface of joined members of a wall part separating two adjacently disposed ink flow paths of different color inks, color mixture of two different colors can take place through the void or voids. Additionally, when a wall part separating two adjacently disposed ink flow paths of different color inks has only a small bonding area, either one or both of the ink flow paths can be blocked by an overflow 158 or the like of the adhesive agent. Problems such as the above-identified ones can adversely affect the ejection performance and the printing quality of the inkjet recording head.

The present invention has been made in view of the above-identified problems. Hence, an object of the present invention is to provide a method of manufacturing a substrate laminated body that dissolves the above-identified problems attributable to the use of adhesive agent. Another object of the present invention is to provide a substrate for liquid ejection head that has a structure of joined substrates which is highly resistive against ink and can withstand poor adhesion, and a manufacturing method thereof.

SUMMARY OF THE INVENTION

In an aspect of the present invention, there is provided a method of manufacturing a substrate laminated body formed by joining a first substrate for forming a part of a device and a second substrate for forming another part of the device, the method comprising: a temporarily joining step of arranging an adhesive agent outside a first region for forming the device and temporarily joining the first region of the first substrate and the first region of the second substrate in a non-contact state; and a finally joining step of forming a film so as to fill a gap between the opposing surfaces of the first substrate and the second substrate in the first region in the non-contact state and finally joining the first substrate and the second substrate by way of the film.

In another aspect of the present invention, there is provided a method of manufacturing a substrate for liquid ejection head by joining a first substrate having an ejection orifice for ejecting liquid and a first flow path held in communication with the ejection orifice to supply liquid thereto and a second substrate having a second flow path to be linked to the first flow path of the first substrate to complete a liquid flow path, the method comprising: a temporarily joining step of arranging an adhesive agent outside a first region for forming a substrate for liquid ejection head and temporarily joining the first region of the first substrate and the first region of the second substrate in a non-contact state; and a finally joining step of forming a film for filling a gap between the first regions in the non-contact state and for coating a wall surface of the liquid flow path to be formed by the first flow path of the first substrate and the second flow path of the second substrate and finally joining the first substrate and the second substrate by way of the film.

In still another aspect of the present invention, there is provided a substrate for liquid ejection head comprising: a first substrate having an ejection orifice for ejecting liquid and a first flow path held in communication with the ejection orifices to supply liquid thereto; a second substrate having a second flow path linked to the first flow path of the first substrate to complete a liquid flow path; the substrate for liquid ejection head further comprising: a film containing oxide of one of the elements selected from the group consisting of Ta, Ti, Zr, Nb, V, Hf and Si or polyparaxylylene resin which is provided in a gap between the opposing surfaces of the first substrate having the first flow path and the second substrate having the second flow path and on a wall surface of the liquid flow path to be completed by linking the first flow path of the first substrate and the second flow path of the second substrate.

Further features of the present invention will become apparent from the following description of exemplary embodiments with reference to the attached drawings.

BRIEF DESCRIPTION OF THE DRAWINGS

FIGS. 5A, 5B, 5C, 5D and 5E are schematic cross-sectional views of the second embodiment of substrate laminated body of the present invention, illustrating the manufacturing method in different manufacturing steps thereof.

DESCRIPTION OF THE EMBODIMENTS

Now, the method of manufacturing a substrate laminated body according to the present invention will be described in greater detail below by way of a substrate for liquid ejection head.

Figure 1A:
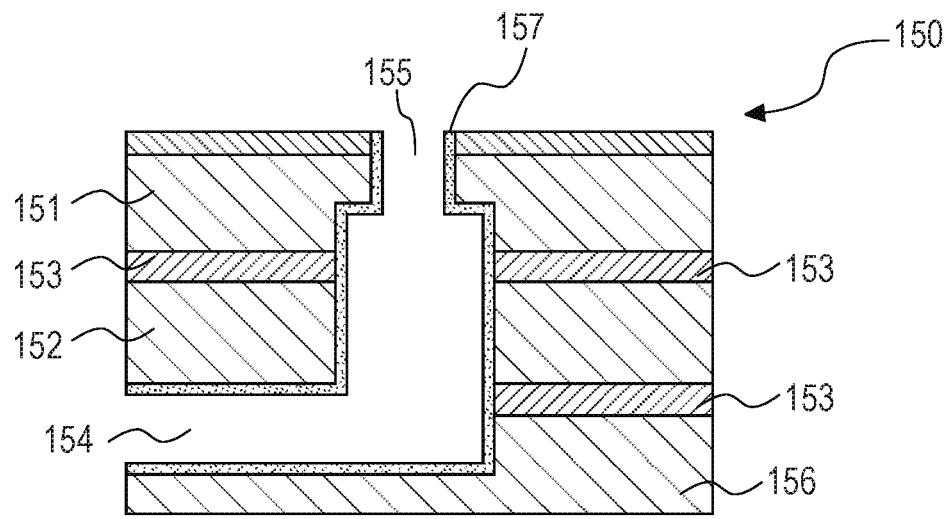
FIG. 1A is a schematic cross-sectional view of a known substrate laminated body, showing its structure
Figure 1B:
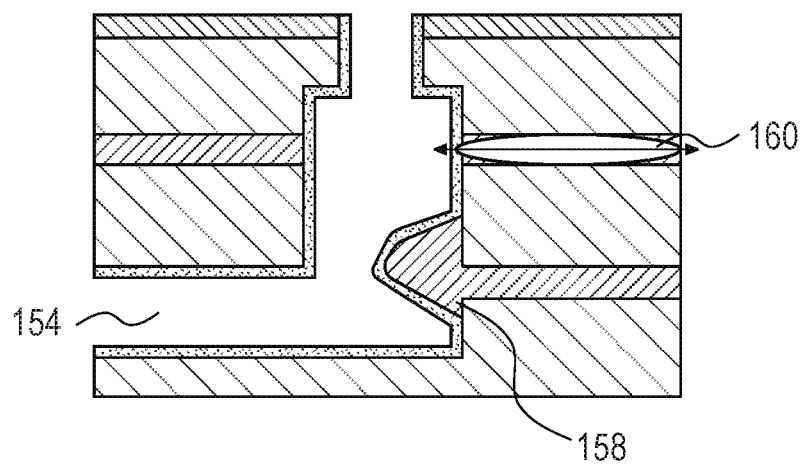
FIG. 1B is cross-sectional view illustrating some of the problems such substrates have.
Figure 2A:
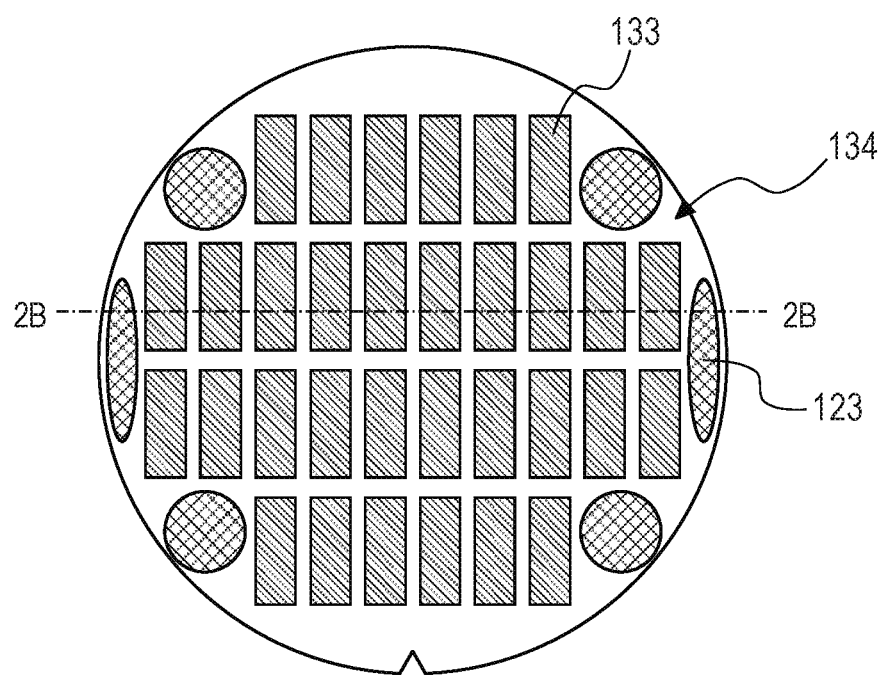
FIG. 2A is a schematic plan view of the first embodiment of substrate laminated body according to the present invention and FIG. 2B is a schematic cross-sectional view of the first embodiment.
Figure 2B:
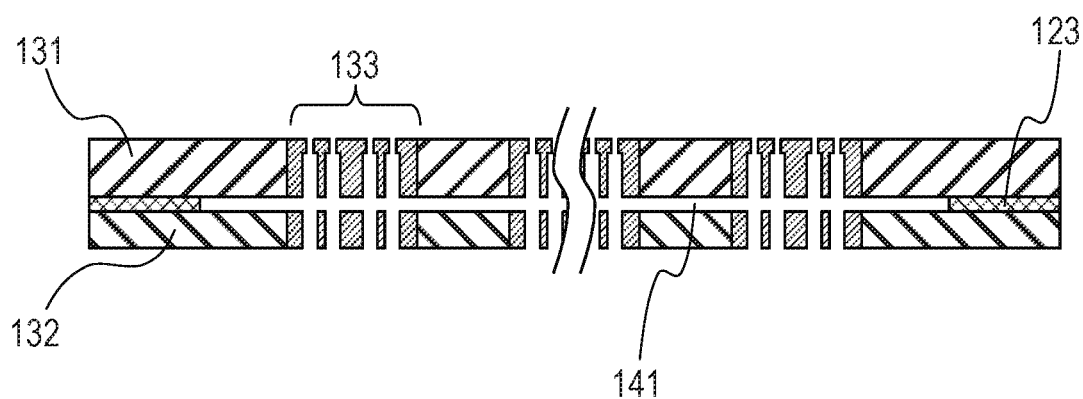

FIG. 2A is a schematic plan view of a wafer-type substrate that can be observed on the way of manufacturing a substrate for liquid ejection head 100 according to the present invention. It has device forming regions (to be also referred to as first regions) 133 where a large number of devices (chips) are formed. FIG. 2B is a schematic cross-sectional view taken along line 2B-2B in FIG. 2A. The outer peripheral part of the wafer is a non-device-forming region (to be also referred to as outer region) 134. With a method of manufacturing a substrate laminated body according to the present invention, at least two or more substrates are joined together and a plurality of neatly arranged devices are formed in it. Then, the substrate laminated body is cut and divided into individual devices (chips). While two substrates (the first substrate and the second substrate) are joined together in the following description, it will be clearly understandable to those who are skilled in the art that three or more substrates can be joined together in a similar manner for the purpose of the present invention.

The manufacturing method according to the present invention involves a method of joining a first substrate for forming a part of each of the devices and a second substrate for forming another part of each of the devices. The method comprises a joining step of arranging an adhesive agent outside the device forming regions and joining each of the device forming regions of the first substrate for forming a part of the device and the corresponding one of the device forming regions of the second substrate for forming another part of the device in a non-contact state and a film forming step of forming a film so as to fill the void space in the each of the region in the non-contact state. More specifically, the adhesive agent is not applied to the first regions 133 of the first substrate 131 where a plurality of devices are formed and the first substrate and the second substrate are partially and temporarily bonded to each other by means of an adhesive agent 123 arranged in the outer region 134. As a result, a gap 141 that provides a region in a non-contact state is formed between the first substrate and the second substrate as shown in FIG. 2B. A film material is filled in the gap by means of a film forming technique to finally join the first substrate and the second substrate. Then, the obtained substrate laminated body is cut (diced) to produce individual chips. In each of the obtained chips (of the substrate laminated body), the first substrate and the second substrate are joined together only by the film formed by means of the film forming technique.

First Embodiment

Figure 3A:
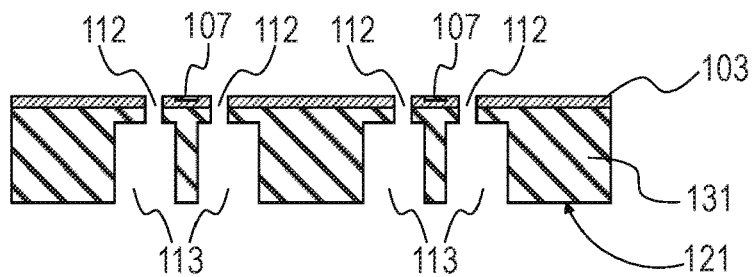
FIGS. 3A, 3B, 3C, 3D and 3E are schematic cross-sectional views of the first embodiment of substrate laminated body of the present invention, illustrating the method of manufacturing it in different manufacturing steps thereof.

Now, the first embodiment of substrate for liquid ejection head and that of method of manufacturing a substrate for liquid ejection head according to the present invention will be described below by referring to the related drawings. FIGS. 3A through 3E are schematic cross-sectional views of the first embodiment of substrate for liquid ejection head, sequentially illustrating different steps of the embodiment of method of manufacturing it. More specifically, FIG. 3E shows a part of the completed embodiment of substrate for liquid ejection head. FIGS. 3A through 3E show a part of the substrate that corresponds to a single device forming region (the first region) 133 shown in FIG. 2B.

<Structure of Substrate for Liquid Ejection Head>

As seen from FIG. 3E, a substrate for liquid ejection head of this embodiment comprises a substrate laminated body 130 formed by joining the first substrate 131 and a second substrate 132 by way of a film 124 so as to put them one on the other. As shown in FIG. 3A, energy generating elements 107 to be utilized to eject liquid are formed on one of the opposite surfaces of the first substrate 131 that the substrate laminated body 130 comprises. Additionally, a surface membrane layer 103 that includes a wiring film for driving the energy generating elements 107 and an interlayer insulating film is also formed on the above-identified surface. Furthermore, as shown in FIG. 3E, an ejection orifice forming member 119 for forming ejection orifices 101 is also formed on the above-identified surface. The ejection orifice forming member 119 includes a top board 117 where the ejection orifices 101 are open and lateral walls 118 that define pressure chambers 102 for applying the energy generated from the energy generating elements 107 to liquid, the pressure chambers 102 being held in communication with the ejection orifices 101. Note that the ejection orifices 101 and the pressure chambers 102 may be regarded as a sort of flow paths.

Referring to FIG. 3E, liquid flow paths 115 are arranged in the substrate laminated body 130 and the film 124 is formed on the inner wall surfaces of the flow paths 115 so as to cover both the first substrate 131 and the second substrate 132. The film 124 will be described in detail hereinafter. As shown in FIG. 3A, each of the flow paths 115 includes a first flow path 112, a second flow path 113 and a third flow path 114. The first flow paths 112 are connected to the corresponding pressure chambers 102, each of which corresponds to one of the ejection orifices 101. The second flow paths 113 are respectively connected to the plurality of first flow paths 112 in the liquid ejection head so as to distribute liquid to the first flow paths 112. The third flow paths 114 are respectively connected to the second flow paths 113 so as to feed liquid from the outside (not shown) of the substrate laminated body. In this embodiment, of the flow paths 115, the first flow paths 112 and the second flow paths 113 serve as the first flow paths formed in the first substrate 131, while the third flow paths 114 serve as the second flow paths formed in the second substrate 132. The first flow paths and the second flow paths are respectively linked to each other to form the flow paths of the substrate for liquid ejection head.

<Method of Manufacturing Substrate for Liquid Ejection Head>

(1. Step of Preparing First Substrate and Second Substrate)

First, as shown in FIG. 3A, the first substrate 131 on whose surface a surface membrane layer 103 and energy generating elements 107 are formed by way of a photolithography process is prepared. Any of various substrates that are suited to form energy generating elements 107 and wiring film can be used for the first substrate 131. The first substrate 131 preferably contains a chemical substance selected from a group consisting of silicon, silicon carbide, silicon nitride, glass (quartz glass, borosilicate glass, alkali free glass, soda glass, etc.), alumina, gallium arsenide, gallium nitride, aluminum nitride and aluminum alloys. Of the above-listed chemical substances, a substrate of silicon, or silicon substrate, is suitably employed for the first substrate 131. The energy generating elements 107 may suitably be electrothermal transducer elements or piezoelectric elements. If necessary, the first substrate 131 can be subjected to a thinning process from the rear surface side thereof. The accuracy of processing the substrate for forming the through holes can be improved by subjecting the substrate to a thinning process. On the other hand, however, the strength of the substrate is reduced as a result of such a thinning process. Thus, after accurately forming through holes by processing the substrates including the first substrate 131, the plurality of substrates are joined together in order to improve the strength of the substrates. Complex paths can accurately be formed by processing each of the plurality of substrates separately and independently. Techniques that can be used for the thinning process include polishing and wet etching by means of chemical liquid such as fluorine nitrate. Additionally and preferably, the rear surface of the first substrate 131 is smoothed for the purpose of easy joining of the first substrate 131 and the second substrate 132 in a joining process that will be described hereinafter. Techniques that can be used for the smoothing operation include polishing using a whetstone of a large grit number, dry polishing, CMP (chemical mechanical polishing), dry etching by means of reactive gas and wet etching by means of chemical liquid such as fluorine nitrate.

Then, the first flow paths 112 and the second flow paths 113 are formed in the first substrate 131. Techniques that can be employed to form the flow paths include dry etching, wet etching, laser ablation and sandblasting. The first substrate 131 is dug to the middle of the substrate from the rear surface thereof to form groove-shaped second flow paths 113. Additionally, the first substrate 131 is also dug from the front surface hereof until the dug parts get to the respective second flow paths 113 in order to produce the plurality of hole-shaped first flow paths 112. Note that the shape of the first flow paths 112 and that of the second flow paths 113 are not limited to the above-described ones and optimal shapes can be selected for them depending on the requirements that the device has to meet. Furthermore, the sequence in which they are formed is not limited to the above-described one. For example, the first flow paths 112 may be formed first and the second flow paths 113 may be formed after forming the first flow paths 112.

Figure 3B:
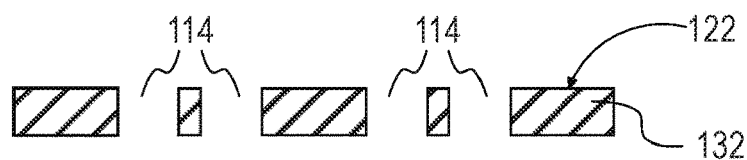

Then, the second substrate 132 as shown in FIG. 3B is prepared. Materials that can be used for the first substrate 131 can also be used for the second substrate 132. Particularly, a silicon substrate is preferably employed for the second substrate. The second substrate 132 can also be subjected to a thinning process and a smoothing process just like the first substrate 131.

Subsequently, the third flow paths 114 are formed as through holes in the second substrate 132 by means of a technique similar to the one employed for forming the first flow paths 112 and the second flow paths 113.

(2. Step of Temporarily Joining First Substrate and Second Substrate)

Figure 3C:
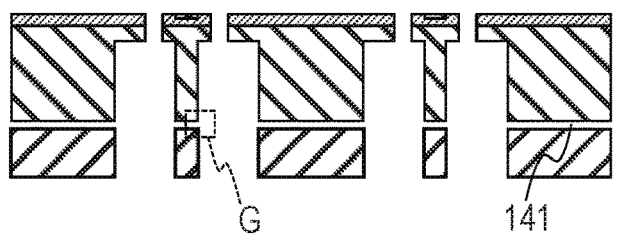

Thereafter, as shown in FIG. 3C, the first substrate 131 and the second substrate 132 are brought into a state where they are rigidly held in position with a gap 141 secured between the two substrates. To hold the substrates in position, the adhesive agent 123 is applied to the outer region 134 other than the first regions 133 of the opposing surface 121 of the first substrate 131 as shown in FIG. 2A and the first substrate 131 and the second substrate 132 are joined by way of the adhesive agent. At this time, the first substrate 131 and the second substrate 132 are aligned to each other so as to make the related ones of the first flow paths 112, the second flow paths 113 and the third flow paths 114 communicate with each other and establish the flow path 115. In this embodiment, the adhesive agent 123 is applied to only part of the outer region and hence the first substrate 131 and the second substrate 132 are brought into a state where they are rigidly held in position with a space (to be referred to as gap hereinafter) 141 left between them to keep the opposing surfaces 121 and 122 of the first substrate 131 and the second substrate 132 in a non-contact state in the first regions 133.

Figure 4A:
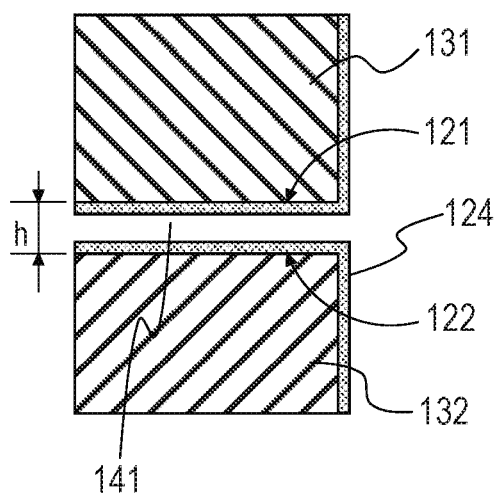
FIGS. 4A, 4B, 4C and 4D are enlarged schematic cross-sectional views of unjoined region (gap) 141 in region G shown in FIG. 3C, illustrating the film forming process in different manufacturing steps thereof.
Figure 4B:
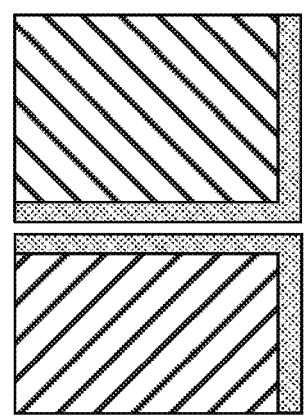
Figure 4C:
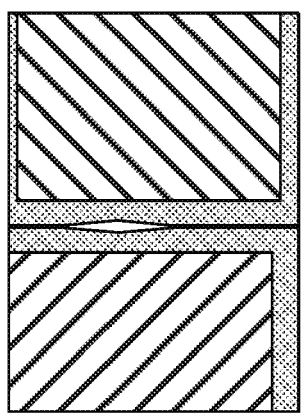

To fill and close the gap 141 with film as shown in FIGS. 4A through 4D, which will be described in greater detail hereinafter, the height h of the gap shown in FIG. 4A is preferably found within a predetermined range. More specifically, the height h is preferably not less than $1.0 \times 10^{-2}$ µm (10 nm) in a narrow region and not more than $6.0 \times 10^{-1}$ µm (600 nm) in a broad region. The height h of the gap can be controlled by optimizing the parameters of the manufacturing method in the temporarily joining step. More specifically, a desired height h can be obtained by appropriately controlling the material of the adhesive agent, the thickness of the applied adhesive agent, the bonding pressure, the bonding temperature and the duration of the pressure application.

A material that can tightly adhere to the substrates is desirably employed for the adhesive agent 123. Additionally, the material preferably contains bubbles, if any, only to a small extent and shows a high coatability and a low viscosity so as to allow the adhesive agent 123 to be applied only to a small thickness. Preferably, the adhesive agent 123 contains a resin material selected from a group consisting of epoxy resin, acrylic resin, silicon resin, benzocyclobutene resin, polyamide resin, polyimide resin and urethane resin. Techniques that can be employed to cure the adhesive agent 123 include thermal curing and UV delayed curing. When either one of the substrates shows UV transparency relative to UV rays, a UV curing technique can be employed on the adhesive agent 123.

While any widely known adhesive agent application technique can be employed to apply the adhesive agent 123 without limitations, a preferable exemplar technique is the use of an adhesive transfer method that involves the use of a transfer film. More specifically, with this technique, a transfer film is brought in and the adhesive agent is thinly and uniformly applied onto the transfer film by spin coating. Then, the adhesive agent can be applied only onto the outer region 134 by bringing the opposing surface 121 of the first substrate 131 that faces the second substrate 132 into contact with the adhesive agent layer on the transfer film, thereby transferring the adhesive agent layer onto the first substrate 131, and subsequently removing the unnecessary part of the applied adhesive agent layer. The size of the transfer film is preferably not smaller than the size of the first substrate 131.

The operation of temporarily joining the substrates is executed by heating the substrates to a predetermined temperature in an apparatus for joining the substrates and substantially applying pressure of a predetermined pressure level to the substrates for a predetermined period of time. The parameters for joining the substrates are appropriately selected in advance depending on the material of the adhesive agent. Preferably, the operation of temporarily joining the substrates is executed in vacuum or under reduced pressure in order to minimize the risk of allowing bubbles to get into the temporarily joined part of the substrates.

When a thermal curing type adhesive agent is selected for the adhesive agent 123, the inside of the apparatus for joining the substrates may be heated until the adhesive agent 123 is cured in the apparatus. Alternatively, the substrate laminated body may be taken out after the temporarily joining operation and heated in an oven or the like to promote the curing of the adhesive agent. When the adhesive agent 123 is of the UV delayed curing type, the substrates are temporarily joined together after irradiating the adhesive agent 123 with UV rays to a specified dose in advance and prior to the temporarily joining operation. After the temporarily joining operation, the substrate laminated body is preferably heated further to satisfactorily promote the curing. When the adhesive agent 123 is of the UV curing type, after temporarily joining the substrates, UV rays are irradiated onto the adhesive agent 123 to a specified dose by way of the substrate that shows UV transparency to cure the adhesive agent 123. After the temporarily joining operation, the substrate laminated body is preferably heated further to satisfactorily promote the curing.

(3. Step of Forming Film (Final Joining))

Figure 3D:
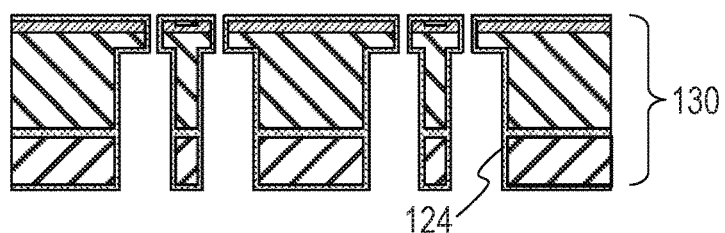
Figure 3E:
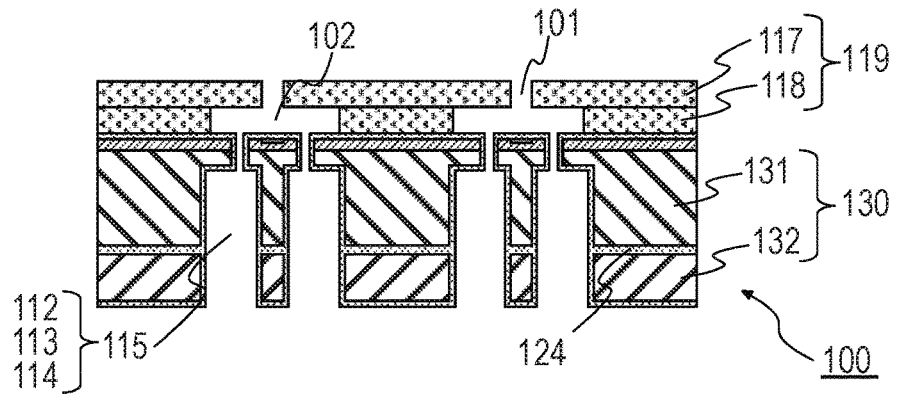

As shown in FIG. 3D, the film 124 is formed to fill and close the gap 141. More specifically, referring to FIG. 3D, the inner walls of the flow paths in the first substrate 131 and the second substrate 132 are coated with the film 124. At the same time, the film 124 is also formed in the gap 141 between the first substrate 131 and the second substrate 132. Preferably, the film 124 is formed so as to fill and close the gap 141. The expression of forming film so as to fill and close the gap 141 refers to that film 124 is formed without any break in the gap 141 by way of the film forming process shown in FIGS. 4A through 4D, that the gap is filled with film when viewed from any of the flow paths and that the substrates are held in a state of being joined together by way of the film 124. Note that FIGS. 4A through 4D are enlarged views of the part G in FIG. 3C.

Figure 4D:
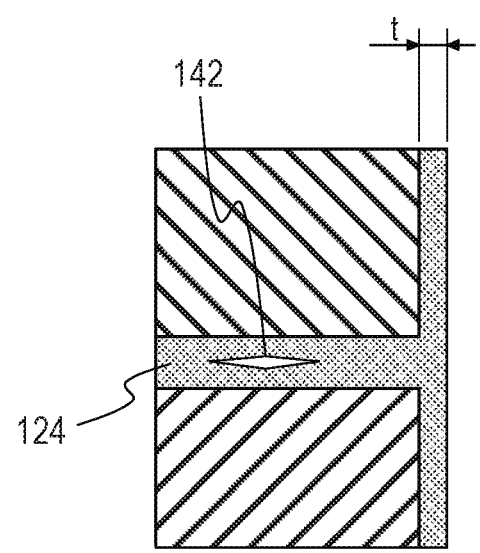

FIG. 4D shows how the gap 141 is filled and closed by the film 124. The film 124 is sandwiched between the opposing surface 121 of the first substrate 131 and the opposing surface 122 of the second substrate 132. Since the film 124 can tightly be held in contact with the substrates, it will hardly come off from the substrates even when stress arises in the film 124.

With regard to the technique to be used to form the film 124, the atomic layer deposition (ALD) technique is preferably employed. With the ALD technique, a cycle of "saturated adsorption of the source material"→"complete gas elimination from the remaining source material"→"oxidation or some other reaction of reactive gas"→complete elimination of the remaining gas" is introduced and the cycle is repeated until film is formed to an intended thickness.

The above-described film forming technique is hardly influenced by the gas flow rate and can secure film uniformity and film reproducibility.

Since the film forming operation, using the ALD technique, utilizes saturated adsorption of the source material by the substrates, it will show a satisfactory performance even when the film to be formed is required to show a complex profile.

With this manufacturing method, a step of causing the gasified source material (precursor) to isotropically adhere to the entire areas of the substrates in a heated vacuum chamber and a step of eliminating the excessive precursor after causing the precursor to adhere to the substrates by a necessary amount are executed. Thereafter, water molecules that operate as reactive gas is fed in to cause the precursor molecules that are adhering to the substrate surface and the water molecules to react with each other and the remaining gaseous water molecules are eliminated to realize a situation where the target film 124 is adsorbed on the substrate surface and the adsorbed film shows a film thickness of about the size of a molecule. The above-described cycle is repeated for hundreds of times to thousands of times to form a film laminate 124 that shows the required thickness.

At this time, the hydroxyl groups existing on the surfaces of the substrates adsorb the functional groups in the precursor and the functional groups deprive the hydroxyl groups of hydrogen atoms and leave the surfaces of the substrates as volatile molecules. Thereafter, the oxygen atoms that are left behind and the elements in the precursor are bonded to each other to show covalent bonds. In the gas elimination step, the gas molecules that could not be adsorbed on the surfaces of the substrates in the film depositing process and lingering in the chamber are eliminated.

With the ALD technique, film that is tightly held in contact with a substrate can be produced because the covalent bonds that are formed by the ALD technique are strong bonds. Additionally, since the ALD technique provides a large and non-directional mean free path for molecules, the produced film shows strong throwing power relative to grooves and holes that have a high aspect ratio. For this reason, the material for forming film can easily flow into the gap 141 and form a uniform film on the entire walls in the inside of the gap. Thus, with the ALD technique, it is possible to form from both of the opposing surfaces 121 and 122 that define the gap 141 as shown in FIG. 4A. Additionally, as a result of repeatedly depositing a film that shows the film thickness of about the size of an atom, the inside of the gap 141 can substantially be filled with the film 124 that is integrally combined with the substrates as will be seen from the film depositing process shown in FIGS. 4A through 4D.

One or more voids 142 can be produced in the inside of the gap 141 as shown in FIG. 4D depending on the film deposition rate and the film thickness of the deposited film. If such is the case, however, the deposited film can hardly come off because the film is tightly held in contact with the substrate in the completely closed part of the gap 141 that surrounds the void or voids.

Film forming techniques other than the ALD technique can also be employed to form the film so long as the produced film shows strong throwing power. Techniques other than the ALD technique that can be employed to form the film include CVD (chemical vapor deposition) techniques such as thermal CVD and catalytic CVD and vacuum deposition techniques. While the throwing power that is produced by any of these techniques is less strong if compared with the ALD technique, these techniques can provide a higher film deposition rate and produce a film that is substantially free from impurities such as carbon, hydrogen and water.

The film 124 is highly resistant to liquid and remains stable if exposed to liquid so that it takes a role of protecting the substrates against the liquid that is filled in the flow path 115. Preferably, the film 124 contains one of the elements of a group consisting of Te, Ti, Zr, Nb, V, Hf and Si in the form a simple element, an oxide thereof, a nitride thereof or a carbide thereof. More specifically, the film preferably contains oxide of one of the elements of the group consisting of Te, Ti, Zr, Nb, V, Hf and Si.

Additionally, an organic film, particularly a film made of polyparaxylylene resin (also referred to as "parylene"), can also be used for the film 124. For example, film of polyparaxylylene resin (also referred to as "polyparaxylylene film") can be formed by using a (2,2)-para-cyclophane compound, which operates as source gas, and a CVD technique. Furthermore, polyparaxylylene film can also be formed by dimerizing paraxylylene monomer, subsequently heating and gasifying the dimer (diparaxylylene) to turn it into a stable radical by thermal decomposition and causing it to be adsorbed and polymerized on the substrates.

Referring now to FIG. 4D, when the thickness of the film formed on the inner surfaces of the flow paths is expressed by t, the height h of the gap 141 is adjusted so as to meet the relationship requirement of h<2t. This is because, ordinarily, the film 124 is formed on the opposing surface 121 of the first substrate 131 and on the opposing surface 122 of the second substrate 132 with the same thickness and hence the film 124 can highly probably fill and close the gap 141 when the value of twice of t is greater than the value of h. More desirably, t and h satisfy the relationship requirement of h≤t.

In order to raise the force by which the film is held in tight contact with the substrates, the gap arranged between the substrates is preferably filled with the film and completely closed without leaving any voids in the film.

(4. Step of Forming Ejection Orifice Forming Members)

Thereafter, as shown in FIG. 3E, an ejection orifice forming member 119 that includes a top board 117 and a flow path wall 118 are formed on the substrate laminated body 130. More specifically, firstly, dry film resist that includes a film base member and photo curing resin applied onto the film base member is bonded onto the substrate laminated body 130. Subsequently, the flow path wall 118 is subjected to a patterning operation (to form a latent image) by exposing the dry film resist to light so as to produce pressure chambers 102 and then the top board 117 of the ejection orifice forming members is also subjected to a patterning operation by using dry film resist so as to produce ejection orifices 101. Finally, the ejection orifices 101 and the pressure chambers 102 are actually produced by developing the latent image to complete the process of producing a substrate for liquid ejection head including a substrate laminated body. While both positive type dry film resist of which any part that is exposed to light is dissolved in developing liquid and negative type dry film resist of which any part that is exposed to light is not dissolved in developing liquid can be employed for the purpose of the present invention, the use of negative type dry film resist is preferable from the viewpoint of stability of the component members.

Thereafter, the wafer is diced to produce individual (devices) chips. Any known dicing technique can non-limitatively be employed for the dicing operation. As a result of the dicing operation, the outer region that is bonded by the adhesive agent 123 is removed and the chips that are produced as a result of the dicing operation operate so many substrate laminated bodies, in each of which the substrates are joined together only by the film 124. While voids 142 can be formed in the cut regions (margins) because the chips are separated from each other by large margins, the dicing operation can be so executed as to eliminate all such voids 142. Furthermore, the risk of producing large voids 142 cay be minimized by forming dummy through holes (also referred to as dummy holes) in the marginal regions to be cut for dicing and forming the film 124 by way of the dummy holes.

Second Embodiment

Now, the second embodiment of method of manufacturing a substrate laminated body and that of method of manufacturing a substrate for liquid ejection head will be described by referring to the related drawings. FIGS. 5A through 5E are schematic cross-sectional views of the second embodiment of substrate laminated body of the present invention, illustrating the manufacturing method in different manufacturing steps thereof. Note that this embodiment will be described below by putting stress on the parts thereof that differ from their counterparts of the first embodiment. In other words, the parts of this embodiment that are the same as their counterparts of the first embodiment will be described only summarily or will not be described any further.

(1A. Step of Preparing First Substrate)

Referring to FIG. 5A, a first substrate 131 is processed to form first flow paths 112 and second flow paths 113 as in the first embodiment.

(1A'. Level Difference Producing Step)

In this embodiment, unlike the first embodiment, the opposing surface 121 of the first substrate is divided into a first opposing surface 121a and a second opposing surface 121b that show a level difference and a protruding part 126 is produced respectively from each of the second opposing surfaces 121b between the related two second flow paths 131. A technique as described below can be used to produce such a level difference on the opposing surface 121. Firstly, an etching mask is formed for the opposing surface 121 of the first substrate 131 where second flow paths 113 are formed (see FIG. 3A). To form an etching mask having large openings like those of the second flow paths 113, a technique of laminating the opposing surface 121 with a dry film on which resist has been processed and transferring the resist can preferably be employed. Alternatively, an etching mask for processing the opposing surface 121 of the first substrate 131 to produce the first opposing surface 121a may be formed in advance before forming the second flow paths 113. A material that is thermally stable and also stable relative to the processing operation of producing the second flow paths 113 can suitably be employed for the etching mask. Examples of such materials include known resist materials, organic resin materials that are insoluble relative to stripping solutions and inorganic films such as silicon oxide film and silicon nitride film formed by a vapor phase growth method. Subsequently, the substrate is subjected to an etching process by way of the etching mask to produce the first opposing surface 121a. Thereafter, the etching mask is removed by means of a stripping solution, oxygen plasma ashing, dry etching or some other appropriate technique. At this time, the substrate laminated body may be washed to remove the deposits produced as a result of the etching process and adhering to the inner wall surfaces of the flow paths and the opposing surface by means of a stripping solution for removing such deposits.

(1B. Step of Preparing Second Substrate)

Then, the second substrate 132 as shown in FIG. 5B is prepared. As for the second substrate 132, third flow paths 114 are formed in it as through holes as in the instance of the first embodiment.

(2. Step of Temporarily Joining First Substrate and Second Substrate)

Figure 6A:
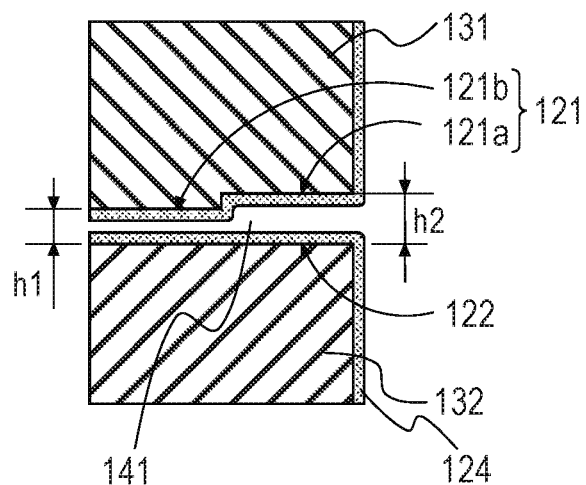
FIGS. 6A, 6B, 6C and 6D are enlarged schematic cross-sectional views of unjoined region (gap) 141 at and near the protruding part in region G shown in FIG. 5C, illustrating the film forming process in different film forming steps thereof.
Figure 6B:
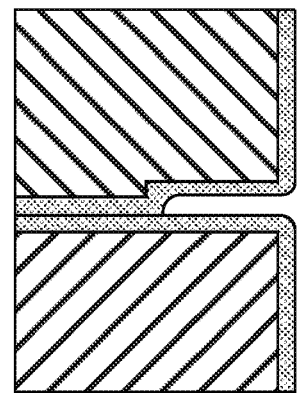
Figure 6C:
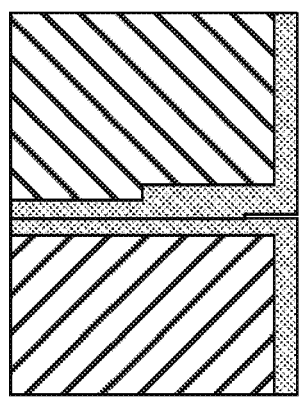

Referring to FIG. 5C, a substrate for liquid ejection head is formed by rigidly securing (temporarily joining) the first substrate 131 and the second substrate 132 by means of an adhesive agent with a gap 141 separating the first substrate 131 and the second substrate 132 as in the instance of the first embodiment. The gap 141 needs to be arranged such that the broader part (the part having a height of h2 as shown in FIG. 6A) thereof is found within the preferable range of h described above for the first embodiment (3. Step of Forming Film)

Referring to FIG. 5D, film is formed by means of a technique similar to the one employed for the first embodiment.

Figure 6D:
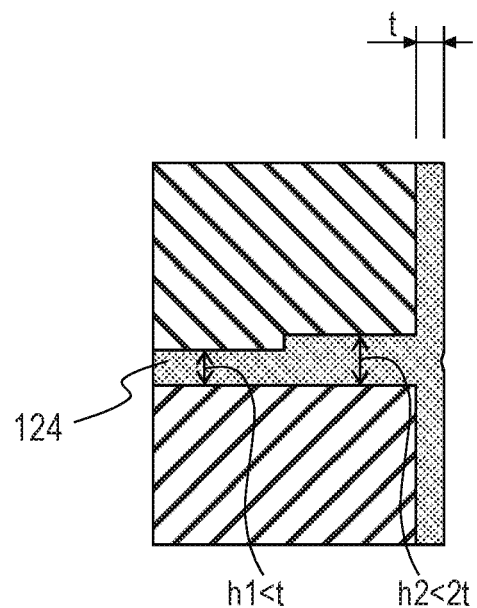

FIGS. 6A through 6D are enlarged schematic cross-sectional views of the region G shown in FIG. 5C. The thickness of the film 124 formed on the inner wall surface of the flow paths is expressed by t. As for the gap 141 of the substrate shown in FIG. 6A, the height of the gap 141 between the opposing surface 122 of the second substrate 132 and the second opposing surface 121b of the first substrate 131 is expressed by h1, while the height of the gap 141 between the opposing surface 122 of the second substrate 132 and the first opposing surface 121a of the first substrate 131 is expressed by h2. The height h1 and the height h2 has a relationship of h1<h2 and, with regard to the film thickness t of the film 124, the relationship requirement of h2<2t is preferably satisfied on the first opposing surface 121a as shown in FIG. 6D. Additionally, the relationship requirement of h1<t is preferably satisfied on the second opposing surface 121b also as shown in FIG. 6D. This is because the film is normally formed to show a film thickness same as the height h2 in the gap between the first opposing surface 121a and the opposing surface 122 and hence the gap can conceivably be filled and closed by the film 124 when the value of twice of the film thickness t is greater than the height h2 of the gap.

With the arrangement and the execution of the process as described above by referring to FIGS. 6A through 6D, the part of the gap 141 having the height of h1 is filled and closed first if compared with the part of the gap 141 having the height of h2 particularly on the side of the related flow path and hence the risk of forming a void or voids in the gap is minimized. Note that, the region of the gap that is completely filled and closed with film is preferably maximized from the viewpoint of raising the force with which the film is tightly held in contact with the substrates and the technique employed for the second embodiment is highly suited for raising the force with which the film is held in tight contact with the substrates.

(4. Step of Forming Ejection Orifice Forming Member)

Thereafter, referring to FIG. 5E, an ejection orifice forming member 119 is formed on the substrate laminated body 130 as in the instance of the first embodiment to complete the process of manufacturing the substrate for liquid ejection head.

While the second embodiment is described above in terms of producing a level difference (unevenness) on the opposing surface 121 of the first substrate 131, a level difference may alternatively be produced on the opposing surface 122 of the second substrate 132 or on both of the opposing surfaces 121 and 122. In other words, at least either one of the opposing surfaces of the first substrate and the second substrate is subjected to an operation of forming a level difference.

Third Embodiment

Now, the third embodiment of method of manufacturing a substrate laminated body and that of method of manufacturing a substrate for liquid ejection head of the present invention will be described below by referring to the related drawings. Note that this embodiment will be described below by putting stress on the parts thereof that differ from their counterparts of the second embodiment. In other words, the parts of this embodiment that are the same as their counterparts of the second embodiment will be described only summarily or will not be described any further.

(1A. Step of Preparing First Substrate and Second Substrate)

Referring to FIGS. 5A and 5B, a first substrate having an opposing surface where a level difference is formed and a second substrate are prepared as in the instance of the second embodiment. While the mask employed to form a level difference on the first substrate is omitted from the above description of the second embodiment, the mask employed to form the level difference of this embodiment will be described below.

(1B. Oxide Film Forming Step of Forming Oxide Film on Flow Path Wall Surfaces of First Substrate and Second Substrate)

Figure 7A:
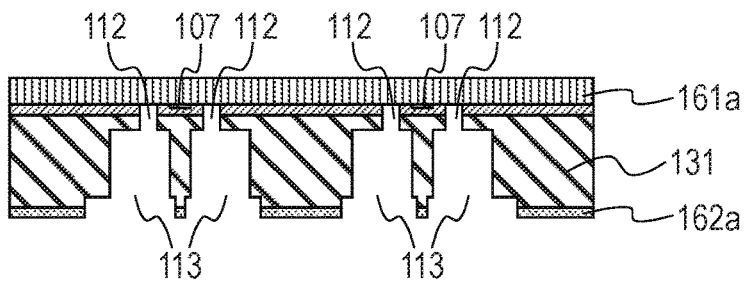
FIGS. 7A, 7B, 7C, 7D, 7E, 7F and 7G are schematic cross-sectional views of the third embodiment of substrate laminated body of the present invention, illustrating the manufacturing method in different manufacturing steps thereof.
Figure 7B:
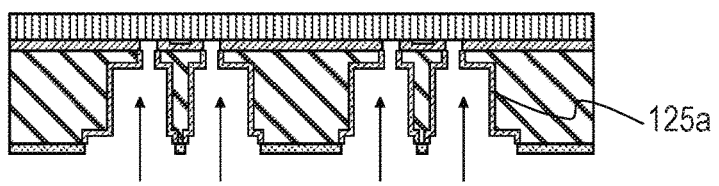
Figure 7C:
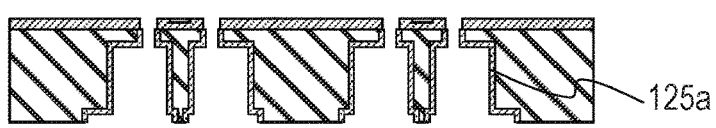

FIGS. 7A through 7C schematically illustrate the steps of forming an oxide film on the wall surfaces of the first flow paths 112, those of the second flow paths 113 and the recessed regions, which are the first opposing surfaces 121a, of the first substrate 131. A mask 162a is formed on the second opposing surfaces 121b. Additionally, a protective member 161a, which is typically a protective tape, is arranged on the device forming surface of the first substrate 131 (FIG. 7A). Then, an oxide film 125a is formed on the exposed substrate surfaces by way of an oxidization process, which involves an ashing process using oxygen plasma or the like. More specifically, when the first substrate 131 is a silicon substrate, a silicon oxide film is formed as the oxide film 125a (FIG. 7B). The film thickness of the oxide film 125a may appropriately be selected so long as the level difference remains between the first opposing surfaces 121a and the second opposing surfaces 121b. Subsequently, the mask 162a and the protective member 161a are removed (FIG. 7C).

Figure 7D:
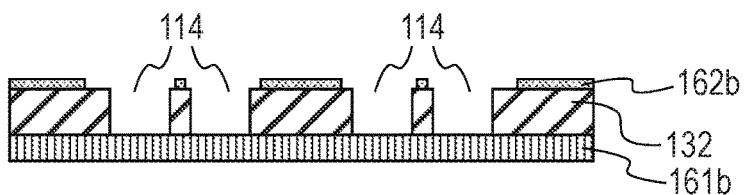
Figure 7E:
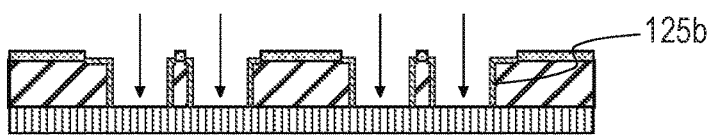
Figure 7F:

Then, an oxide film 125b is formed on the second substrate 132 in a similar manner as shown in FIGS. 7D through 7F. At this time, a mask 162b is arranged so as not to form an oxide film on the areas of the opposing surface 122 of the second substrate 132 that respectively face the second opposing surfaces 121b of the first substrate 131. A protective member 161b is arranged on the surface of the second substrate 132 located opposite to the opposing surface 122. When an oxide film is allowed to be formed on the surface of the second substrate 132 located opposite to the opposing surface 122, an oxidation process may be executed without arranging a protective member 161b. Then, an oxide film 125b is formed by way of an oxidation process, which involves an ashing process using oxygen plasma, similar to the one illustrated in FIG. 7B. Then, the mask 162b and the protective member 161b are removed (FIG. 7F).

(2. Step of Temporarily Joining First Substrate and Second Substrate)

Figure 7G:
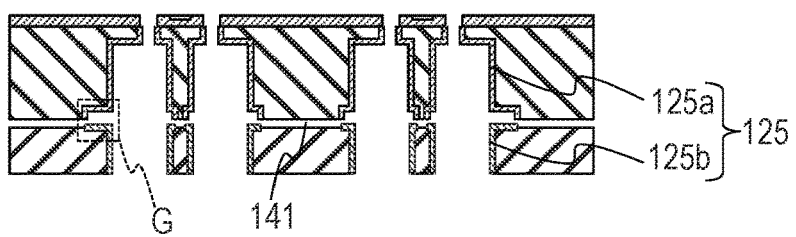
Figure 8A:
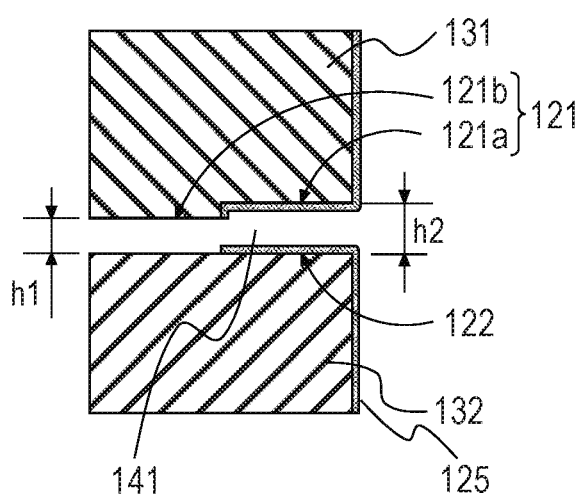
FIGS. 8A, 8B, 8C and 8D are enlarged schematic cross-sectional views of unjoined region (gap) 141 at and near the protruding part in region G shown in FIG. 7G, illustrating the film forming process in different film forming steps thereof.
Figure 8B:
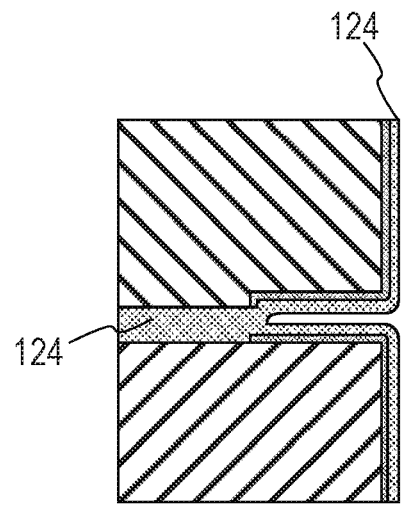
Figure 8C:
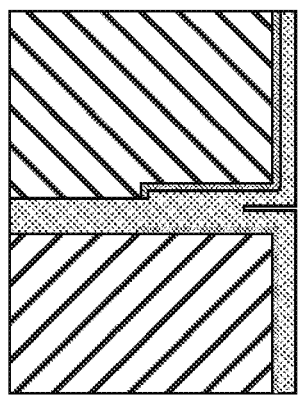
Figure 8D:
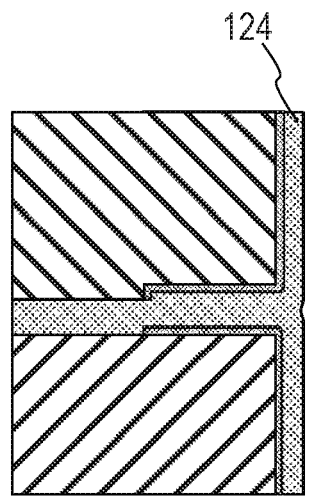

Referring to FIG. 7G, a substrate for liquid ejection head is formed by rigidly securing (temporarily joining) the first substrate 131 and the second substrate 132 by means of an adhesive agent with a gap 141 separating the first substrate 131 and the second substrate 132 as in the instance of the first embodiment.

(3. Step of Forming Film)

Like FIGS. 6A through 6D, FIGS. 8A through 8D are enlarged schematic cross-sectional views of the region G shown in FIG. 7G, illustrating the process of forming a film 124 in the gap 141 by means of the ALD technique.

In the gap 141 between the first substrate 131 and the second substrate 132, the amount of the precursor supplied to it gradually decreases from the lateral surfaces of the substrate laminated body toward the inside of the substrate laminated body so that the film thickness is apt to be gradually decreased accordingly. Particularly, this tendency is remarkable in the region of the gap where the second opposing surface 121b of the first substrate 131 and the opposing surface 122 of the second substrate 132 are separated by a small distance, or height, of h1. Then, as a result, the gap can firstly be filled with and closed by the precursor in areas located close to the lateral surfaces of the substrate laminated body so that one or more voids can be produced in the inside. To prevent such a problem from taking place, an oxide film 125 is formed on the opposing surfaces located close to the right side lateral surface since the precursor is less adsorbed on the oxide film 125 so that film is properly formed by means of the ALD technique in the inside of the gap between the opposing surfaces to give rise to a difference in the film forming rate. In other words, the gap is filled and closed first in the inside of the substrate laminated body to further minimize the risk of producing one or more voids 142 in the inside of the substrate laminated body.

(4. Step of Forming Ejection Orifice Forming Member)

Thereafter, an ejection orifice forming member 119 is formed on the substrate laminated body 130 as in the instance of the first embodiment to complete the process of manufacturing the substrate for liquid ejection head.

While the first through third embodiments are described above in terms of forming a substrate laminated body by joining two substrates, the number of substrates to be joined together to produce a substrate laminated body is not limited to two and three or more substrates may alternatively be joined together to produce a substrate laminated body for the purpose of the present invention. Additionally, while the second flow paths 113 and the third flow paths 114 have the same width in the above description, the present invention is by no means limited to the use of the same width for both the second flow paths 113 and the third flow paths 114. In other words, the width of the second flow paths 113 and that of the third flow paths 114 may differ from each other and/or the third flow paths 114 may partly be closed or may be processed to operate as filter. In any instance, it is sufficient for the substrate laminated body to have flow paths through which liquid can flow from one of the opposite surfaces to the other surface.

Now, the present invention will be described in greater detail below by way of examples. Note, however, that the present invention is by no means limited to the examples and those who are skilled in the art can appropriately modify and/or alter what is described below under the examples within the scope of the present invention.

Example 1

An 8-inch silicon substrate (thickness: 730 μm) on the surface (mirror surface) of which aluminum wiring, interlayer insulating film of silicon oxide thin film, a thin film pattern for heaters made of tantalum nitride and a contact pad for making the substrate electrically conductive to an outside control unit were formed was prepared as the first substrate 131 (FIG. 3A). A 180 μm-thick UV curing tape was bonded to the front surface of the first substrate 131 as protective tape and the rear surface of the first substrate was subjected to a thinning process, using a grinding machine, until the substrate was thinned to show a thickness of 500 μm. Thereafter, the ground surface was polished to smooth the surface by means of a CMP apparatus. The polishing operation was executed by using a slurry that contains colloidal silica as principal component and a polyurethane-based polishing pad. Thereafter, the polished surface was cleansed with a cleansing solution, which was a mixture solution containing ammonia by 8 mass %, hydrogen peroxide water by 8 mass % and pure water by 84 mass % to remove the slurry.

Then, a mask (not shown) for forming the second flow paths 113 was formed. To do this, firstly a polyamide resin material was applied to the entire rear surface of the substrate to a thickness of 2 µm by means of a spin coating technique and then the applied polyimide resin material was cured by way of a thermal treatment process at 250° C., which was executed for 1 hour. Thereafter, novolac-based resist was applied onto the mask and then subjected to a patterning process including exposure to light of the applied resist by means of a double-sided alignment and exposure system and development of the latent image of the resist pattern by means of a development apparatus. A dry etching process was executed by using plasma produced by discharging $O_2$ gas and $CF_4$ gas by way of the resist in order to make the mask show a desired profile. After the etching process, the resist was removed to complete the operation of forming a polyamide resin-made mask.

Subsequently, grooves for producing the second flow paths 113 were formed by means of an etching operation. A Bosch process of repeating etching, using $SF_6$ gas, and deposition, using $CF_4$ gas, was employed for the etching operation. The etching operation was terminated when the average depth of the grooves got to 300 µm. After eliminating the protective tape by irradiating UV rays, the remaining resist and the etching deposit were removed by means of a stripping solution containing hydroxyl amine as principal component.

Then, a protective tape was bonded to the rear surface of the first substrate and a resist mask was formed on the front surface thereof by means of the technique same as the above-described one. The first flow paths 112 that consist in a plurality of holes were formed from the front surface side of the substrate by dry etching. After the dry etching process, the protective tape was removed and the resist and the deposits were removed by means of a stripping solution.

Thereafter, a 500 µm-thick silicon substrate was brought in as the second substrate (FIG. 3B). A protective film was bonded to the front surface (mirror surface) of the second substrate and a resist mask was formed on the rear surface thereof. Third flow paths 114 were formed by way of a Bosch process. Subsequently, the protective film was peeled off and the resist and the deposits were removed by means of a stripping solution.

Then, an adhesive agent 123 was arranged on the rear surface of the first substrate as shown in FIGS. 2A and 2B. An epoxy-based photosensitive resin material was employed for the adhesive agent 123 and a tenting method was applied to the entire rear surface of the substrate so as to fill the second flow paths 113.

Then, an exposure mask was employed and the pattern of the exposure mask was exposed to light for the adhesive agent 123 in the outer region 134.

Thereafter, the unexposed part of the adhesive agent 123 was removed by executing a development process, using a developing solution. More specifically, PGMEA (propylene glycol methyl ether acetate) was employed for the developing solution and IPA (isopropyl alcohol) was employed for the rinse solution. A single wafer spin development technique was employed for the development.

Then, a substrate laminated body 130 where the first substrate 131 and the second substrate 132 were temporarily joined by way of the adhesive agent 123 was obtained (FIG. 3C). The thickness of the adhesive agent 123 and the joining conditions were appropriately selected so as to make the height h of the gap 141 equal to 0.5 µm.

Subsequently, film 124 was formed on the inner wall surfaces of the flow paths of the substrate laminated body by means of an ALD apparatus. In this example, a TiO film was formed as the film 124 to a thickness of 0.3 µm so as to fill and close the gap. More specifically, titanium tetrachloride (vapor) was introduced into the film forming space of the apparatus as Ti precursor along with carrier nitrogen gas at a flow rate of 1.1 slm to purge the film forming space. Thereafter, water (steam) was introduced as reactant gas along with carrier nitrogen gas at a flow rate of 4.6 slm to oxidize the precursor. After purging the film forming space, a cycle of "precursor introduction—purge—reactant gas introduction—purge" was repeated until a predetermined film thickness was obtained. A temperature of 300° C. was employed during the film forming process.

Thereafter, dry film resist formed by using positive type resist was laid on the front surface of the first substrate 131 of the substrate laminated body as laminate to form an etching mask. The TiO film 124 on the contact pad was removed by dry etching, using plasma of mixture gas of $CF_4$, $O_2$ and Ar.

Then, the wall parts 118 of the ejection orifice forming member were formed by bonding a negative type dry film, which was made of epoxy resin, to the surface of the first substrate 131 and exposing the film to light. Additionally, the top board 117 of the ejection orifice forming member was formed by bonding another dry film onto the surfaces of the wall parts 118 and exposing the dry film to light. The films were developed to remove the unexposed parts in order to produce ejection orifices 101 and pressure chambers 102 (FIG. 3E). Thereafter, the ejection orifice forming member was cured by subjecting it to a heat treatment at 200° C. for 1 hour in an oven.

Thereafter, the wafer was diced into individual chips to produce substrates for liquid ejection head of this example.

To examine the film 124 formed on the inner wall surfaces of the flow paths of each of the substrates for liquid ejection head prepared in the above-described manner, the head was cut in the direction of the cross section shown in FIGS. 3A through 3E to expose the inner wall surfaces of the flow paths and the inner wall surfaces were observed through an optical microscope and an electronic microscope to find no crack at all on the joined surfaces.

With regard to the performance of the process of joining the substrates, the substrate laminated bodies 130 that were immersed in ink were stored in a constant temperature bath at 60° C. for two months and then the substrate laminated bodies 130 were observed for film thinning and abnormal appearance.

As a result, the observed film thinning was between 0 nm and 5 nm and no abnormal appearance was recognized.

With regard to the evaluation of the film quality, a composition analysis was executed by means of X-ray photoelectron spectroscopy to confirm the composition ratio.

Example 2

The first flow paths 112 and the second flow paths 113 were formed on the first substrate 131 as in Example 1.

In this example, a polyamide resin-made mask was formed as a mask for forming protruding parts 126 and a resist-made mask was formed as a mask for forming the second flow paths 113. The second flow paths 113 were produced by etching.

A protective tape was laid on the front surface side of the first substrate as laminate and the rear surface of the first substrate was etched by way of the mask for forming protruding parts 126 and by means of silicon anisotropic etching, using $SF_6$ plasma, until the etched depth got to 0.3 µm to produce protruding parts 126 on the first opposing surface. Thereafter, the resist and the deposits were removed by means of a stripping solution (FIG. 5A).

Then, a 500 µm-thick silicon substrate was brought in as the second substrate 132 and a protective film was laid on the front surface (mirror surface) of the second substrate 132, while a resist mask was formed on the rear surface of the second substrate 132 and the third flow path was formed by way of a Bosch process (FIG. 5B). Thereafter, the protective film was peeled off and the resist and the deposits were removed by means of a stripping solution.

Subsequently, an adhesive agent 123 was applied to the outer region 134 of the first substrate 131 as in Example 1 and the first substrate 131 and the second substrate 132 were temporarily joined (FIG. 5C). At this time, the bonding operation using the adhesive agent was executed so as to make h1 of the gap 141 to be equal to 0.2 µm.

Then, a film was formed on the inner wall surfaces of the flow paths of the substrate laminated bodies by means of an ALD apparatus (FIG. 5D). As the film, a TiO film was formed to a film thickness of 0.3 µm so as to fill and close the gap.

Thereafter, the wall parts 118 and the top board 117 of the ejection orifice forming member were formed as in Example 1 and then a substrate for liquid ejection head, in which the liquid flow path 115 was held in communication with the pressure chambers 102 and the ejection orifices 101, were prepared (FIG. 5E).

The prepared substrates for liquid ejection head were evaluated for the film 124 formed on the inner wall surfaces of the flow paths by means of the technique same as the one employed in Example 1 to find that no crack was observed on the joined surfaces and no abnormal appearance was recognized.

Example 3

The first flow paths 112, the second flow paths 113 and the protruding parts 126 of this example were formed in the first substrate 131 as in Example 2. Example 3 differed from Example 2 in that, after forming the protruding parts 126, an ashing process was executed by way of a mask 162a and by means of oxygen plasma and an oxide film 125 was formed on the level difference-showing surface and the lateral surfaces of the first flow paths and the second flow paths to a thickness from 7 nm to 10 nm (FIGS. 7A through 7C). Additionally, after forming the third flow paths 114 in the second substrate 132, a protective film 161b was bonded to the surface of the second substrate 132 opposite to the opposing surface 122 thereof and a tenting method was applied to the resist mask on the opposing surface 122 of the second substrate 132. Then, a mask 162b was formed in the regions facing the respective protruding parts 126 of the first substrate (FIG. 7D). Subsequently, an oxide film 125b was formed in the regions other than the regions covered by the protective tape 161b and the mask 162b and on the lateral surfaces of the third flow paths by executing an ashing process, using oxygen plasma (FIG. 7E). Thereafter, the protective film was peeled off and the mask resist was stripped off (FIG. 7F).

Then, the first substrate 131 and the second substrate 132 were joined together by way of a film 124 as in Example 2 and the wall parts 118 and the top board 117 of the ejection orifice forming member were formed on the device forming surface of the first substrate 131 to produce the substrates for liquid ejection head of this example, in which the liquid flow paths 115 were held in communication with the pressure chambers 102 and the ejection orifices 101 that corresponded to them.

The prepared substrates for liquid ejection head were evaluated for the film 124 formed on the inner wall surfaces of the flow paths by means of the technique same as the one employed in Example 1 to find that no crack was observed on the joined surfaces and no abnormal appearance was recognized.

Example 4

The first flow path 112 and the second flow path 113 were formed in the first substrate 131 as in Example 1.

Then, an adhesive agent 123 was arranged on the outer region 134 of the first substrate and the first substrate 131 and the second substrate 132 were temporarily joined together as in Example 1 (FIG. 5C).

Subsequently, a film 124 was formed on the inner wall surfaces of the flow paths of the substrate laminated bodies by means of a chemical vapor deposition (CVD) technique, using polyparaxylylene resin. More specifically, the film 124 was formed by using polyparaxylylene resin in a manner as described below. Firstly, paraxylylene monomer, which was the source material, was thermally decomposed and the decomposition product was quenched in an organic solvent of toluene or benzene to obtain diparaxylylene, which is also referred to as dimer. Then, the diparaxylylene was thermally decomposed to produce radical paraxylylene gas, which was a stable gas, and polyparaxylylene film was obtained by causing the produced gas to be adsorbed and polymerized on the inner wall surfaces of the flow paths. The film was formed to a thickness of 0.3 µm so as to fill and close the gap. Thereafter, dry film resist formed by using positive type resist was laid on the front surface of the first substrate 131 of the substrate laminated body as laminate to form an etching mask. The polyparaxylylene film on the contact pad was removed by dry etching, using plasma of mixture gas of $CF_4$, $O_2$ and Ar and then the resist mask was stripped off and removed.

Then, the first substrate 131 and the second substrate 132 were joined together by way of a film 124 as in Example 1 and the wall parts 118 and the top board 117 of the ejection orifice forming member were formed on the device forming surface of the first substrate 131 to produce the substrates for liquid ejection head of this example, in which the liquid flow paths 115 were held in communication with the pressure chambers 102 and the ejection orifices 101 that corresponded to them.

The prepared substrates for liquid ejection head were evaluated for the film 124 formed on the inner wall surfaces of the flow paths by means of the technique same as the one employed in Example 1 to find that no crack was observed on the joined surfaces and no abnormal appearance was recognized.

As will be clearly seen from the above description, the present invention makes it possible to provide a substrate laminated body without using an adhesive agent by forming a film so as to fill and close the gap between the opposing surfaces of the first and second substrates. Additionally, the present invention can provide a substrate for liquid ejection head comprising a laminated body of two or more substrates that is highly resistive against ink and can withstand poor adhesion by forming a film on the wall parts of the flow paths that run through the substrate at the time of joining the substrates.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-138741, filed Jul. 29, 2019, which is hereby incorporated by reference herein in its entirety.

What is claimed is:

1. A method of manufacturing a substrate laminated body formed by joining a first substrate for forming a part of a device on a first region of the first substrate and a second substrate for forming another part of the device on a first region of the second substrate, the method comprising:
a temporarily joining step of arranging an adhesive agent in a region outside the first region of the first substrate and the first region of the second substrate, and temporarily joining the first region of the first substrate and the first region of the second substrate in a non-contact state; and
a finally joining step of forming a film so as to fill a gap between the first region of the first substrate and the first region of the second substrate, which are on opposing surfaces of the first substrate and the second substrate and are in the non-contact state, and finally joining the first substrate and the second substrate by way of the film.

2. The method according to claim 1, further comprising:
a level difference forming step to be executed prior to the temporarily joining step of forming a level difference on at least one of the opposing surfaces of the first substrate and the second substrate, so as to produce a broader gap in a periphery of the at least one of the opposing surfaces of the first substrate and the second substrate.

3. The method according to claim 2, further comprising:
an oxide film forming step of forming an oxide film on the opposing surfaces of the first substrate and the second substrate in a region having the broader gap produced in the level difference forming step.

4. The method according to claim 1, wherein the film is formed in the finally joining step by means of atomic layer deposition.

5. The method according to claim 1, wherein the film is formed in the finally joining step by means of vapor deposition.

6. The method according to claim 1, wherein the film formed in the finally joining step contains oxide of an element selected from the group consisting of Ta, Ti, Zr, Nb, V, Hf and Si.

7. The method according to claim 1, wherein the film formed in the finally joining step is a polyparaxylylene film.

8. The method according to claim 1, wherein a region for forming the device has a through hole that is completed when the first substrate and the second substrate are joined together.

9. The method according to claim 1, wherein the first substrate and the second substrate are wafer-shaped substrates for forming a plurality of devices and the region for arranging the adhesive agent is an outer peripheral region of the wafer-shaped substrates where no device is produced.

10. A method of manufacturing a substrate for liquid ejection head by joining a first substrate having an ejection orifice for ejecting liquid and a first flow path held in communication with the ejection orifice to supply liquid thereto on a first region of the first substrate and a second substrate having a second flow path to be linked to the first flow path of the first substrate on a first region of the second substrate to complete a liquid flow path, the method comprising:
a temporarily joining step of arranging an adhesive agent in a region outside the first region of the first substrate and the first region of the second substrate, and temporarily joining the first region of the first substrate and the first region of the second substrate in a non-contact state; and
a finally joining step of forming a film for filling a gap between the first region of the first substrate and the first region of the second substrate, which are in the non-contact state, and for coating a wall surface of the liquid flow path to be formed by the first flow path of the first substrate and the second flow path of the second substrate and finally joining the first substrate and the second substrate by way of the film.

11. The method according to claim 10, further comprising:
a level difference forming step to be executed prior to the temporarily joining step of forming a level difference on an opposing surface of the first substrate, which opposes an opposing surface of the second substrate, in a region adjacent to the first flow path or on the opposing surface of the second substrate in a region adjacent to the second flow path.

12. The method according to claim 11, further comprising:
an oxide film forming step of forming an oxide film on a part of the opposing surface of the first substrate and on a part of the opposing surface of the second substrate located in the adjacent region where a broader gap is produced in the level difference forming step.

13. The method according to claim 10, wherein the film is formed in the finally joining step by means of atomic layer deposition.

14. The method according to claim 10, wherein the film is formed in the finally joining step by means of vapor deposition.

15. The method according to claim 10, wherein the film formed in the finally joining step contains oxide of an element selected from the group consisting of Ta, Ti, Zr, Nb, V, Hf and Si.

16. The method according to claim 10, wherein the film formed in the finally joining step is a polyparaxylylene film.

* * * * *